(12) United States Patent
Boucard et al.

(10) Patent No.: US 8,316,171 B2
(45) Date of Patent: Nov. 20, 2012

(54) NETWORK ON CHIP (NOC) WITH QOS FEATURES

(75) Inventors: Philippe Boucard, Le Chesnay (FR); Philippe Martin, La Colle sur Loup (FR); Jean-Jacques Lecler, Cagnes-sur-Mer (FR)

(73) Assignee: Arteris S.A., Guyancourt (FR)

( * ) Notice: Subject to any disclaimer, the term of this patent is extended or adjusted under 35 U.S.C. 154(b) by 204 days.

(21) Appl. No.: 12/835,623

(22) Filed: Jul. 13, 2010

(65) Prior Publication Data

US 2011/0302345 A1 Dec. 8, 2011

(30) Foreign Application Priority Data

Jun. 3, 2010 (FR) ...................... 10 54339

(51) Int. Cl.
G06F 13/14 (2006.01)
(52) U.S. Cl. .................. 710/241; 710/100; 710/316
(58) Field of Classification Search .................. 710/240, 710/244, 100, 316
See application file for complete search history.

(56) References Cited

U.S. PATENT DOCUMENTS

| | | | | |
|---|---|---|---|---|
| 6,584,529 B1 * | 6/2003 | Thomas | ........................ | 710/240 |
| 7,631,132 B1 * | 12/2009 | Neuman | ....................... | 710/244 |
| 7,802,040 B2 * | 9/2010 | Aldworth et al. | ............. | 710/118 |
| 2005/0060445 A1 * | 3/2005 | Beukema et al. | ............... | 710/52 |
| 2009/0303876 A1 | 12/2009 | Wu | | |

OTHER PUBLICATIONS

Bolotin, E. et al., "QNoC: QoS architecture and design process for Network on Chip", *Journal of Systems Architecture*, Elsevier, vol. 50 (Feb. 28, 2004), pp. 1-18.
PCT Application No. PCT/EP2011/058575, International Search Report and Written Opinion dated Jul. 25, 2011, 11 pages.

* cited by examiner

*Primary Examiner* — Glenn A Auve
(74) *Attorney, Agent, or Firm* — Fish & Richardson P.C.

(57) ABSTRACT

Quality-of-Servitrce (QoS) is an important system-level requirement in the design and implementation of on-chip networks. QoS requirements can be implemented in an on-chip-interconnect by providing for at least two signals indicating priority at a transaction-level interface where one signal transfers information in-band with the transaction and the other signal transfers information out-of-band with the transaction. The signals can be processed by the on-chip-interconnect to deliver the required QoS. In addition, the disclosed embodiments can be extended to a Network-on-Chip (NoC).

37 Claims, 10 Drawing Sheets

NETWORK ON CHIP (NOC) WITH QOS FEATURES

CROSS-REFERENCE TO RELATED APPLICATION

This application claims the benefit of a pending foreign priority application filed in France on Jun. 3, 2010, entitled "Network on Chip (NOC) with QOS Features," and assigned French Patent Application No. FR1054339, the content of which is incorporated by reference herein in its entirety.

TECHNICAL FIELD

This subject matter is related generally to semiconductor Intellectual Property (IP) interconnect technology.

BACKGROUND

Many semiconductor designs, both in Integrated Circuit (IC) and in Field Programmable Gate Array (FPGA) applications are constructed in a modular fashion by combining a set of IP cores, such as Central Processing Units (CPUs), Digital Signal Processors (DSPs), video and networking processing blocks, memory controllers and others with an interconnect system. The interconnect system implements the system-level communications of the particular design. The IP cores are typically designed using a standard IP interface protocol, either public or proprietary. These IP interface protocols are referred to as transaction protocols. An example transaction protocol is Open Core Protocol (OCP) from OCP-IP, and Advanced Extensible Interface (AXI™) and Advanced High-performance Bus (AHB™) from Arm Inc. As semiconductor designs have evolved from relatively small, simple designs with a few IP cores into large, complex designs which may contain hundreds of IP cores, the IP core interconnect technology has also evolved.

The first generation of IP core interconnect technology consisted of a hierarchical set of busses and crossbars. The interconnect itself consists mostly of a set of wires, connecting the IP cores together, and one or more arbiters which arbitrate access to the communication system. A hierarchical approach is used to separate high-speed, high performance communications from lower-speed, lower performance subsystems. This solution is an appropriate solution for simple designs. A common topology used for these interconnects is either a bus or a crossbar. The trade-off between these topologies is straightforward. The bus topology has fewer physical wires which saves area and hence cost, but it is limited in bandwidth. The wire-intensive crossbar approach provides a higher aggregate communication bandwidth.

The above approach has a severe limitation in that the re-use of the IP cores is limited. The interfaces of all the IP cores connecting to the same interconnect are required to be the same. This can result in the re-design of the interface of an IP core or the design of bridge logic when a particular IP core needs to be used in another system.

This first generation of interconnect also implements a limited amount of system-level functions. This first generation of IP core interconnect technology can be described as a coupled solution. Since the IP interfaces are logically and physically not independent from each other, they are coupled such that modifying one interface requires modifying all the interfaces.

The second generation of IP interconnect is a partially decoupled implementation of the above described bus and crossbar topologies. In these solutions, the internal communication protocol of the communications system, or transport protocol, is decoupled from the IP interface protocol, or transaction protocol. These solutions are more flexible with regards to IP reuse as in these solutions the semiconductor system integrator can connect IP cores with different interfaces to the same communication system through some means of configurability.

The third generation of IP core interconnect technology is the NoC, which implements not only decoupling between transaction and transport layers, but also a clean decoupling between transport and physical layers. The key innovation enabling this solution is the packetization of the transaction layer information. The command and data information that is to be transported is encapsulated in a packet and the transport of the packet over the physical medium is independent of the physical layer. The packet format consists of a header and a payload. The payload contains the data and data-related qualifiers such as byte-enable signals. The header contains routing information, system-level address, and additional control information such as security-related indicators. In this architecture, the NoC is constructed by connecting a set of IP elements such as network interface units, switches, synchronizers, width converters together through physical links. The elements are selected and connected in such a manner as to meet protocol, performance, Quality-of-Service (QoS), area and timing requirements of the System-on-Chip (SoC).

One challenge in the design of on-chip-interconnect and NoC technology is the requirement to meet the QoS requirements of the IC. Each data-flow from initiator to target has its own bandwidth and latency requirement to be met by the on-chip-interconnect. Certain traffic, such as from CPU to DRAM Controller has a low latency constraint. Other traffic, such as the traffic originating from a video-processing block has a bandwidth constraint that is driven by the "real-time" nature of the data stream. Other traffic may exhibit a burst-like behavior, that is, the traffic intermittently requires a high bandwidth access to a target resource.

SUMMARY

The disclosed implementations include systems and methods for controlling the arbitration of transfers in a NoC. Using these systems and methods, additional interface signals are enabled at IP Core interfaces of the NoC, and logic structures are implemented within the NoC, which take advantage of the information on the interface signals to control the priority of processing of request and response packets within the NoC.

DETAILED DESCRIPTION

Example NoC

Figure 1:
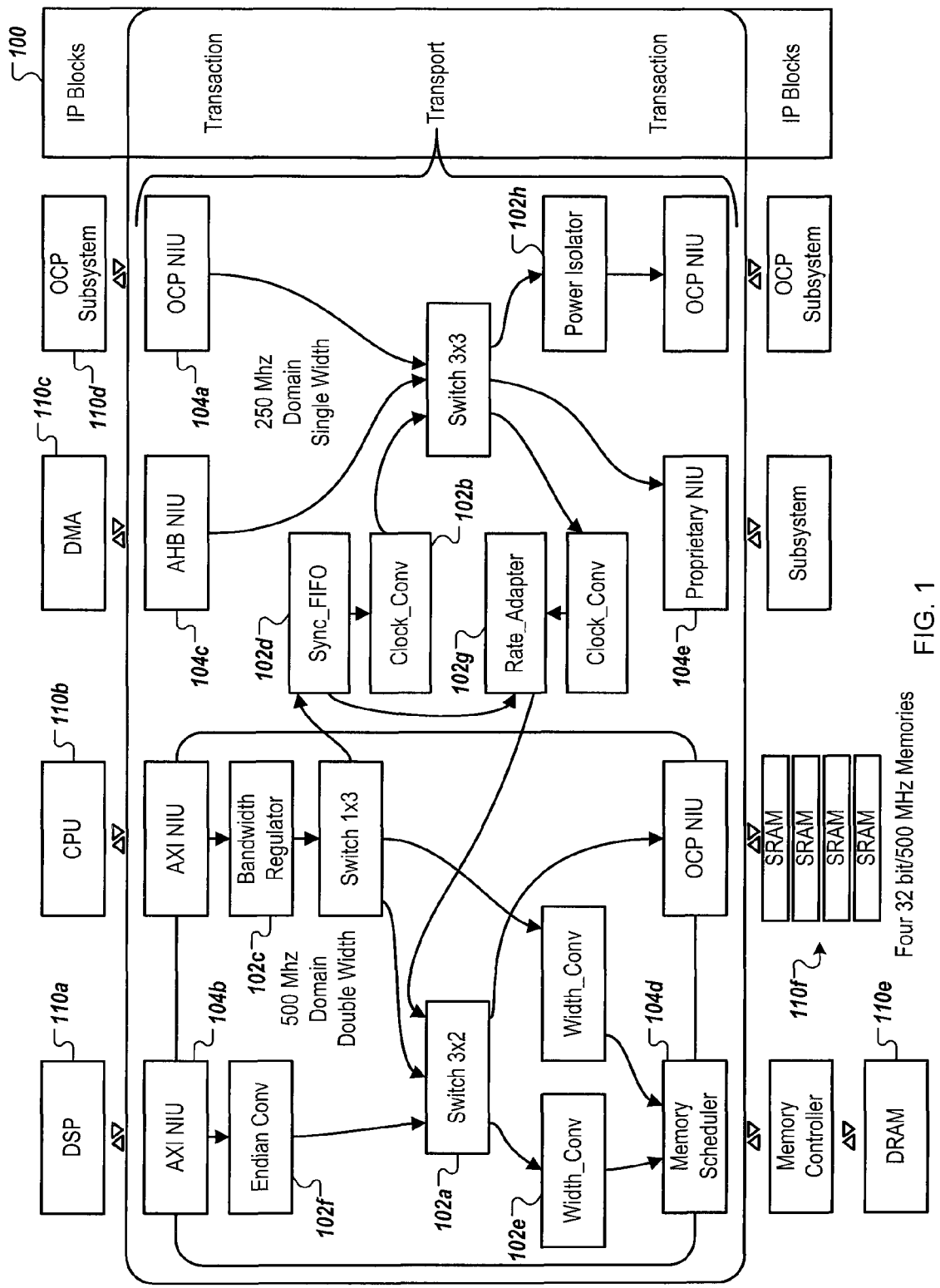
FIG. 1 is a block diagram of an example NoC.

FIG. 1 is a block diagram of an example NoC 100. In some implementations, NoC 100 can be constructed out of a set of IP elements 102 which communicate with each other through a packet-based transport-protocol. Examples of IP elements 102 include but are not limited to: switches 102a, clock converters 102b, bandwidth regulators 102c, sync First-In-First-Out (FIFO) 102d, width converters 102e, Endian converters 102f, rate adaptors 102g, power isolators 102h and other IP elements.

In some implementations, at the edges of NoC 100, Network Interface Units (NIUs) 104 implement a conversion between transaction protocol and transport protocol (ingress) and vice versa (egress). Some examples of NIUs for transaction protocols include but are not limited to: OCP NIU 104a, AXI™ NIU 104b, AHB™ NIU 104c, memory scheduler 104d and a proprietary NIU 104e. The NIUs 104 couple to various IP cores 110. Some examples of IP cores are DSP 110a, CPU 110b, Direct Memory Access 110c, OCP subsystem 110d, DRAM 110e, SRAM 110f and other types of IP cores.

In NoC 100, the transport protocol is packet-based. The commands of the transaction layer can include load and store instructions of one or more words of data that are converted into packets for transmission over physical links. Physical links form connections between the IP elements. An implementation of a transport port protocol used by NoC 100 is described in reference to FIG. 2.

Example Physical Link

Figure 2:
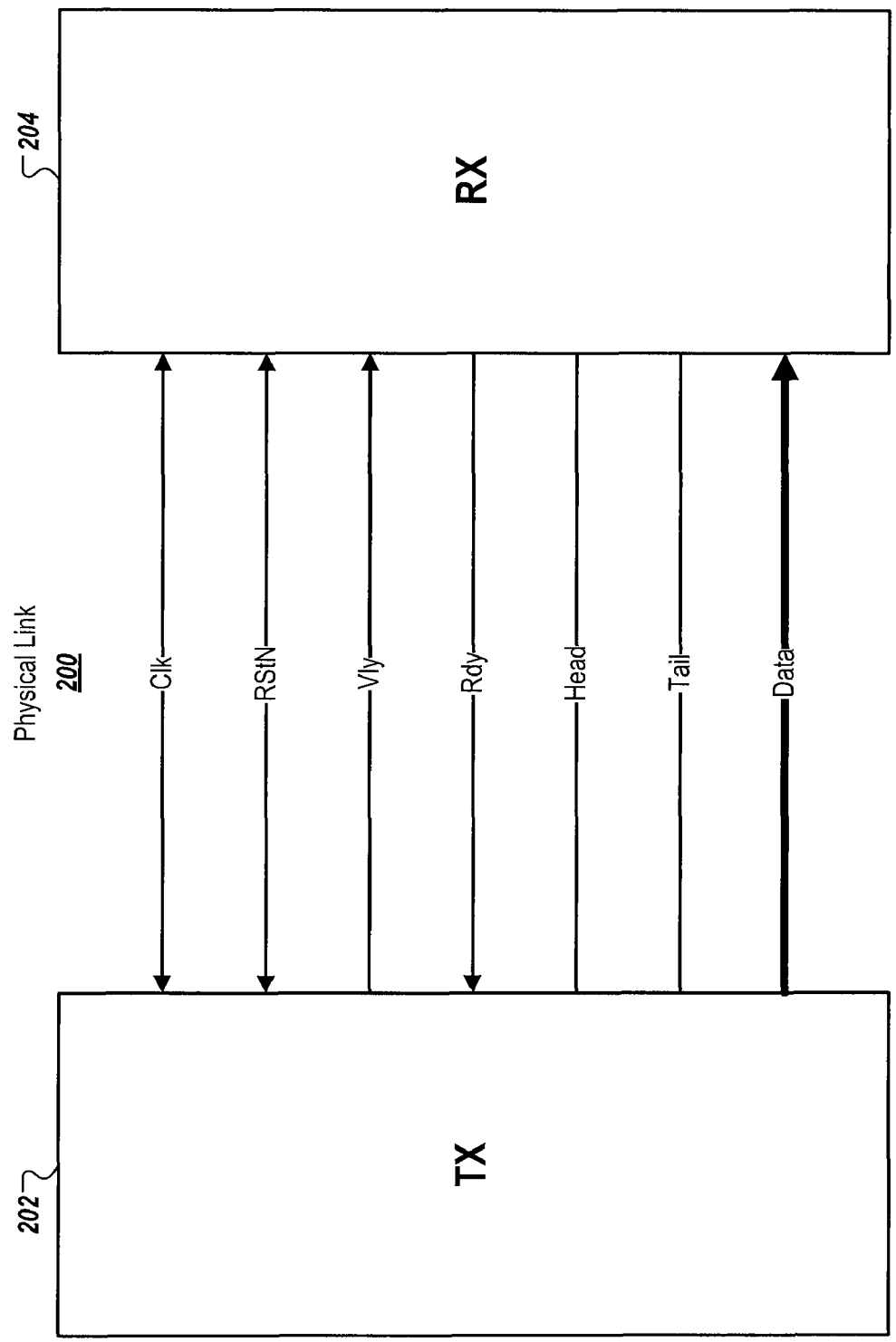
FIG. 2. is an example physical link.

FIG. 2 is a block diagram of an example physical link 200 connecting a transmitter 202 (TX) and a receiver 204 (RX) in NoC 100 of FIG. 1. A transport protocol socket can be used to transfer a packet from transmitter 202 to receiver 204 over physical link 200. The socket can contain flow control signals (Vld, Rdy), framing signals (Head, Tail) and information signals (Data). The socket can be a synchronous interface working on rising edges of a clock signal (Clk). An active low reset signal (RStN) can also be included in the physical link 200. The logical meaning of the different signals in this particular implementation is described next.

- Vld: Indicates that transmitter 202 presents valid information (Head, Tail and Data) in a current clock cycle. When Vld is negated, transmitter 202 drives an X value on Head, Tail and Data and receiver 204 discards these signals. Once transmitter 202 asserts Vld, the signals Head, Tail, Data and Vld remain constant until Rdy is asserted by receiver 204. In this particular implementation, the width of Vld can be 1. Other widths can also be used.
- Rdy: Indicates that receiver 204 is ready to accept Data in a current clock cycle. Rdy can depend (in combination) on Vld, Head, Tail and Data, or can only depend on the internal state of receiver 204. In this particular implementation, the width of Rdy can be 1. Other widths can also be used.
- Head: Indicates a first clock cycle of a packet. In this particular implementation, the width of Head is 1. Other widths can also be used.
- Tail: Indicates a last clock cycle of a packet. In this particular implementation, the width of Tail is 1. Other widths can also be used.
- Data: Effective information transferred from transmitter 202 to receiver 204. Data contains a header and a payload. A data word transfer can occur when the condition Vld AND Rdy is true. The width of Data can be configurable.

Example Packet Transport Sequence

Figure 3:
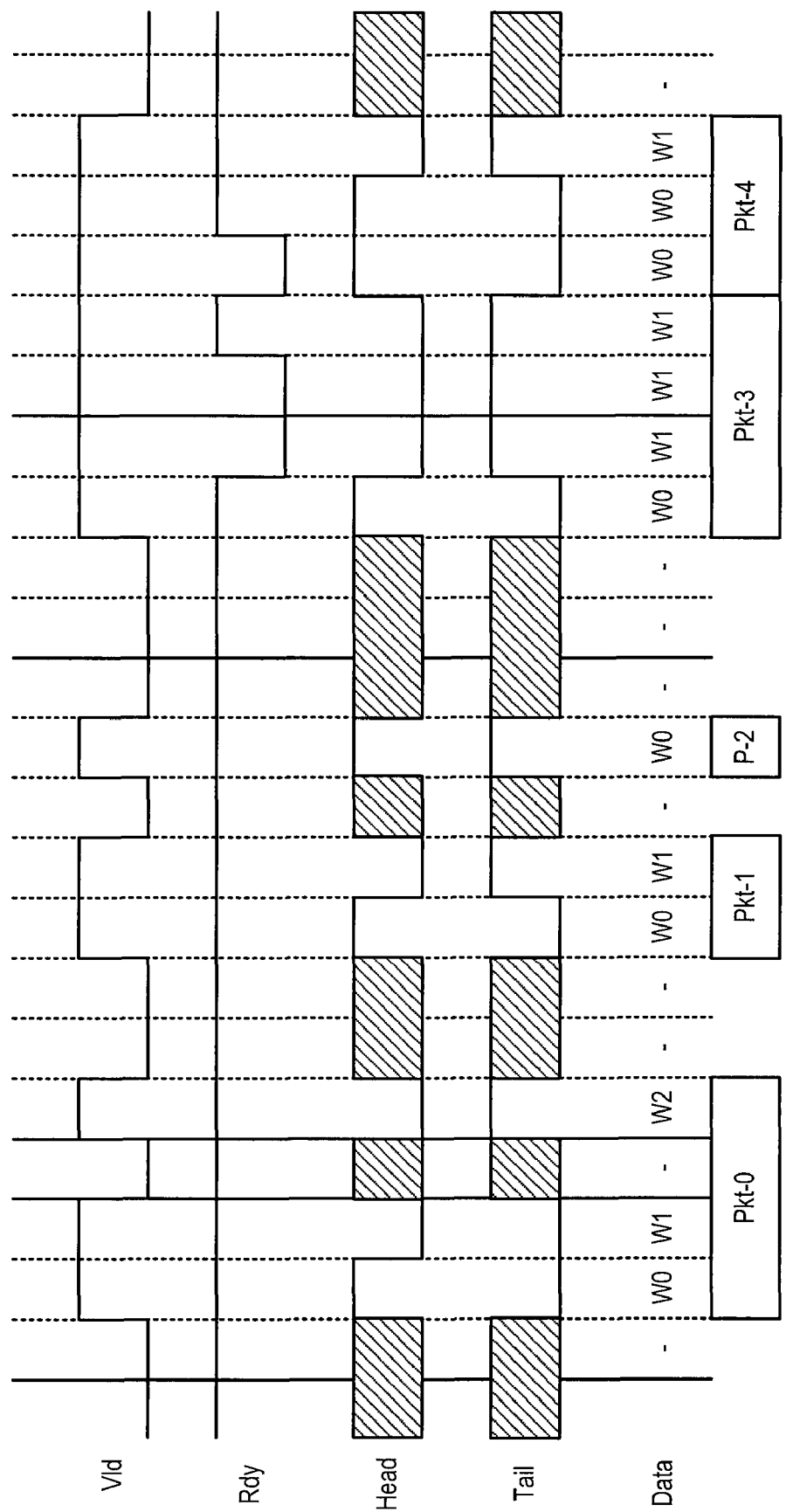
FIG. 3 is an example sequence of a packet transport.

FIG. 3 is an example sequence of packet transport over the link of FIG. 2. In some implementations, a packet starts when Vld and Head are asserted, and completes when Vld and Tail are asserted. A single cycle packet can have both Head and Tail asserted. Inside a packet, Head is negated when Vld is asserted, and outside a packet, Head is asserted simultaneously with Vld. Packet content is carried on the Data signals. In this particular implementation, there are two packet formats: packets with payload (e.g., write requests, read responses), and packets without payload (e.g., all other packet types).

Example Packet

Figure 4:
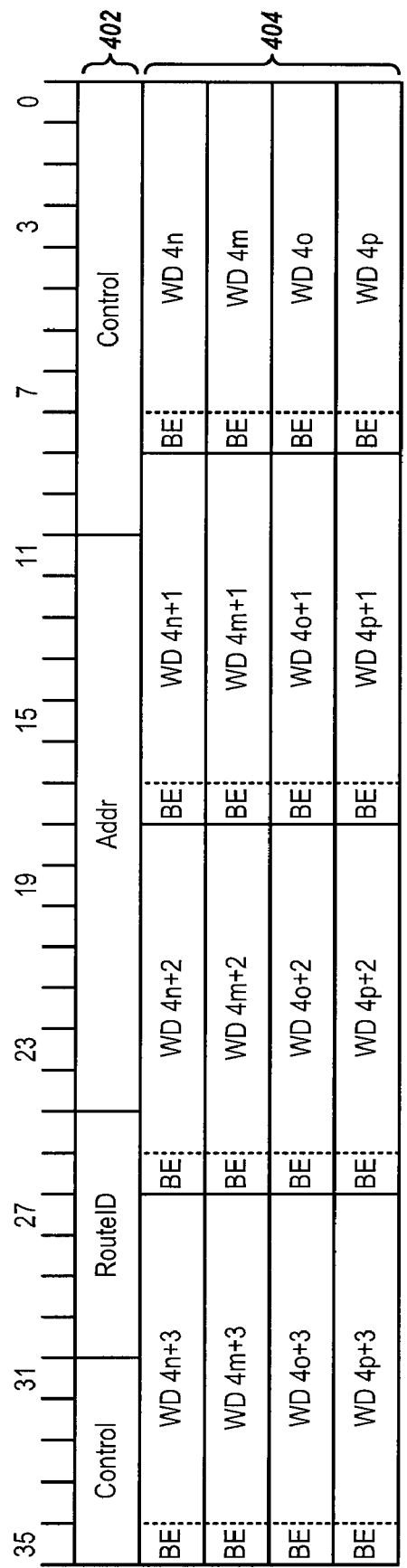
FIG. 4 is an example packet.

FIG. 4 is an example packet for use with NoC 100 of FIG. 1. More particularly, FIG. 4 illustrates an example packet 400 including a header 402 and a payload 404. The example packet 400 can be defined by four bytes (with byte-enables) of payload width and one cycle header penalty. In some implementations of the packet 400, some fields may be optional. In some implementations, header 402 includes a header field containing a RouteID, an Address field (Addr) and several Control fields. The Control fields in the header 402 can carry additional end-to-end or transport protocol information. The use of this Control field for implementing QoS features is the subject of this invention and described in later sections. The meaning of the other fields in header 402 is explained next.

- Addr: This header field indicates the start address of a transaction, expressed in bytes, in the target address space.
- RouteId: This header field uniquely identifies a "initiator-mapping, target-mapping" pair. The pair can be unique information used by routing tables to steer a packet inside NoC 100. The fields in the payload of the packet can be Byte-Enable (BE) field and Data field (Byte). The meaning of these fields is explained next.
- BE: Indicates one Byte Enable bit per payload byte.
- Byte: This field contains the payload part of the packet. The width of this field is configurable, and in some implementations, contains at least 8 bits of data. The width of a Byte can be extended to contain additional information such as protection or security information.

Switch Arbitration, Urgency and Pressure

Figure 5A:
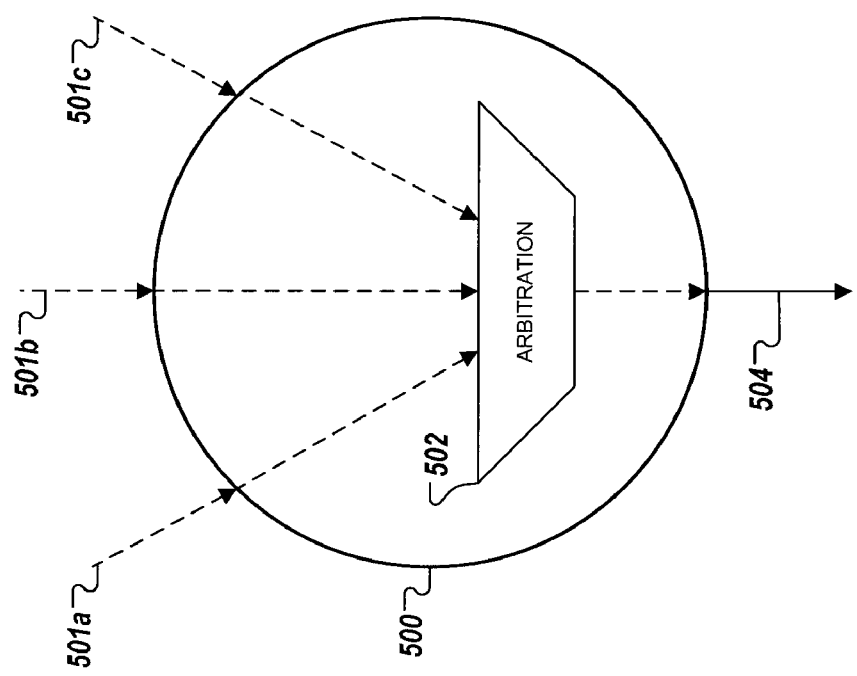
FIG. 5A is an example switch element.

FIG. 5A shows an example of a switch element 500. In this particular example, three inputs 501a-501c are sending packets to a single output 504. When packets arrive at the switch element 500 and are addressed to the single output 504 of the switch 500, an arbitration point 502 is introduced. There are many known arbitration mechanisms that can be used for arbitrating at arbitration point 502 including but not limited to: round-robin, first-in-first-out (FIFO), least-recently-used (LRU), fixed priority and any other mechanism that can be used to arbitrate. These static arbitration schemes operate on input (or port) information on which a particular packet is arriving on, and on the prior arbitration history. In many designs, however, it is desirable to use a dynamic priority mechanism.

Before describing a dynamic arbitration scheme the concept of "urgency" will be explained. "Urgency" is an indicator of the relative priority of a packet that is used by arbitration points in a NoC to implement a multi-level arbitration scheme, where the selection of one output transfer from several available input transfers is made based on a static arbitration between transfers with equal urgency values. In some embodiments, the highest value of "urgency" can be assigned the highest priority. In an alternative embodiment, different values of urgency can be allocated different priorities.

The above described scheme implements a dynamic arbitration scheme. Transfers with the highest priority, for example, as determined by their urgency value, are considered first and arbitrated using a fixed arbitration scheme. If no highest priority transfers are present, transfers with the next level of priority can be considered for transfer, and so forth. In one embodiment, the same static arbitration scheme can be used for arbitration within each level of priority. In other embodiments, different levels of priority can have a different static arbitration schemes.

In some embodiments, an "urgency" value is encoded in-band with the transfer. For example, in a transaction-level based interconnect such as an OCP crossbar, the urgency value can be transmitted with the command information. As another example, in a NoC, the urgency can be transmitted in the header of the packet. In one embodiment, the encoding can be binary, such that n bits (e.g., 3 bits) allow for m=2^n levels of urgency (e.g., m=8 levels using 3 bits).

Figure 5B:
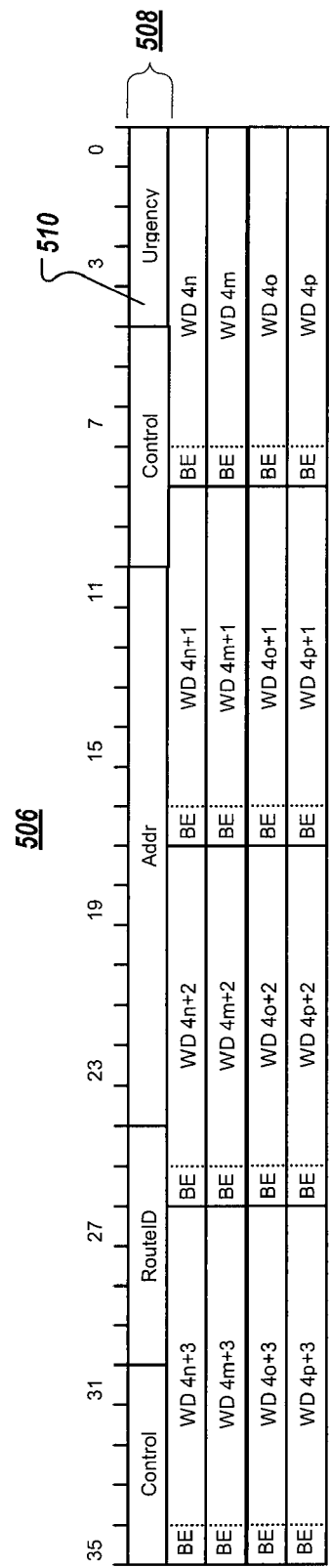
FIG. 5B is an example packet including a header with an "urgency" field.

In another embodiment, the urgency information is encoded using a bar-graph encoding. In one embodiment of bar graph encoding, the value of the urgency is indicated by the highest bit-position in a multi-bit field with the value of "1," while lower bit-positions also have the value of "1." In this example, a 3-bit field can indicate 4 levels of urgency with the four values "000," "001," "011," "111." This or other implementations of bar-graph encoding are particularly efficient in combining urgency information from multiple sources into a common result because a simple OR function can be used to give the desired result. Since the "urgency" value is encoded in the header of a packet, or, is transmitted with the command or data information, the value is considered an in-band signal. FIG. 5B illustrates one implementation of a packet 506 where the "urgency" is a 4-bit field 510 transferred as part of the header 508. Other than the inclusion of the field 510 in the header 508, the packet 506 is the same as packet 400 shown in FIG. 4.

In an on-chip-interconnect, where one particular path from initiator to target can include multiple arbitration points in series, if the urgency is encoded in the header or sent out in-band with a command, an arbiter further down the path cannot take into account the priority of a packet that has not yet reached the input of the arbiter. This can cause delay in the processing of a higher priority packet. To address this potential delay, one embodiment of the invention introduces the concept of "pressure." Pressure is an out-of-band signal that can include one or more bits for carrying urgency information of the urgency field out-of-band through the NoC. In one embodiment, the "pressure" signal can be a bundle of one or more physical wires that are part of the physical links that interconnect different IP elements on a NoC. The "pressure" signal can transport information in an out-of-band manner as described below in reference to FIG. 6.

Example Physical Link With Pressure

Figure 6:
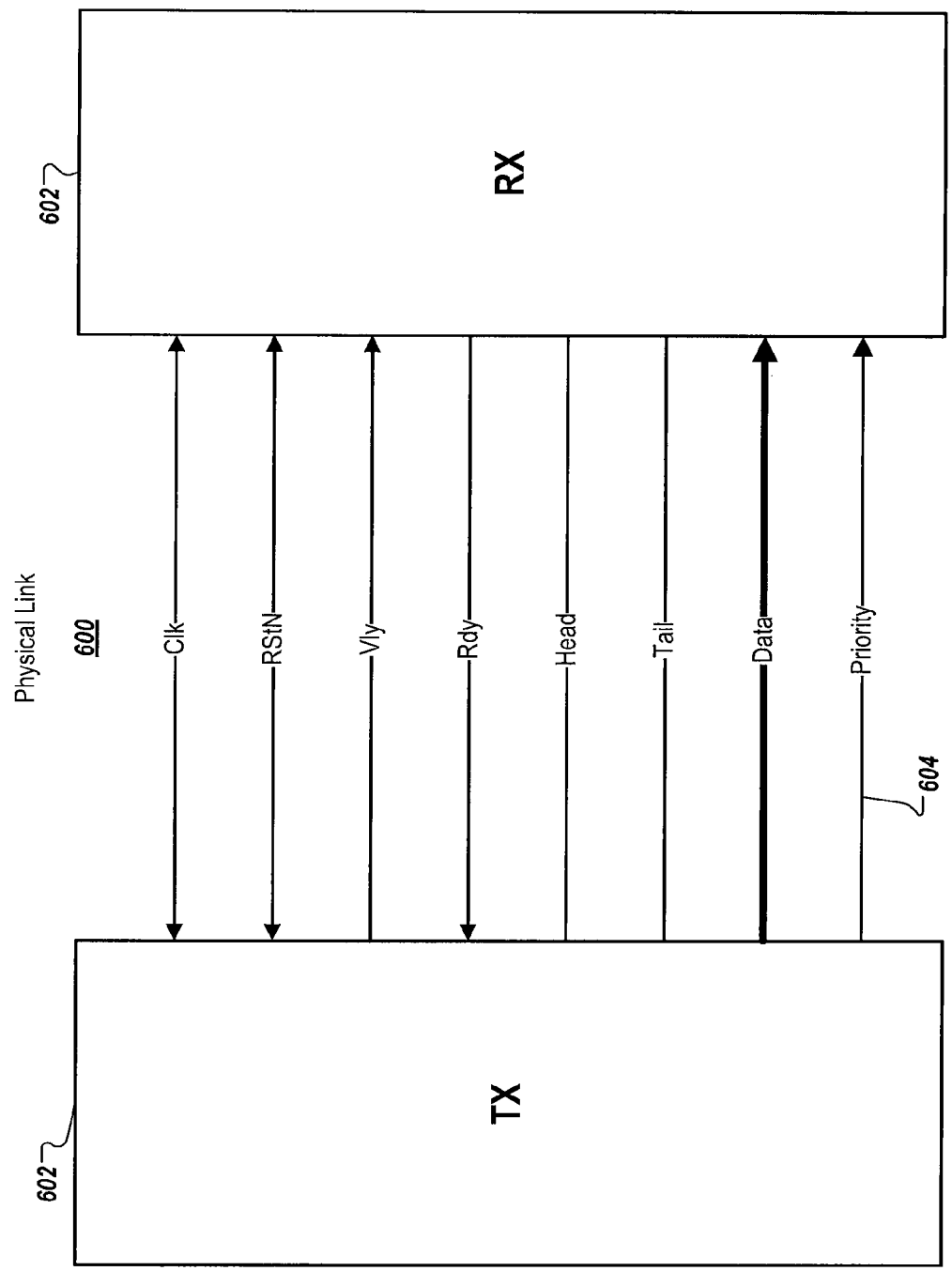
FIG. 6 is an example physical link with out-of-band signaling.

FIG. 6 is a block diagram of an example physical link 600 extending the physical link 200 of FIG. 2 to incorporate an out-of-band pressure (priority) signal 604. When a packet in the network-on-chip is being transmitted through the NoC and encounters back-pressure, that is, the Rdy signal is de-asserted, effectively blocking the packet from progressing through the network, the out-of-band pressure signal 604 on the physical link 600 takes on the value of the urgency that is encoded in the header of that particular packet. Back pressure normally occurs at a point where arbitration occurs, since the basic function of arbitration logic is to select one of a plurality of packets to proceed while holding back the unselected packets using back-pressure.

This above described pressure mechanism allows the urgency value of a packet to propagate ahead of the packet, since the pressure signal 604 is out-of-band. In this particular embodiment, the out-of-band pressure values are routed forward starting from the point of origin through all paths that are back-pressured. With the implementation of the pressure mechanism, an arbiter in an arbitration can consider two values when deciding what input packet to select: the in-band urgency value of the current packet and the out-of-band pressure value on the pressure signal 604 on the link 600 associated with the input port. In one embodiment, the priority value can be determined from the maximum of the urgency value and the pressure value.

Figure 7:
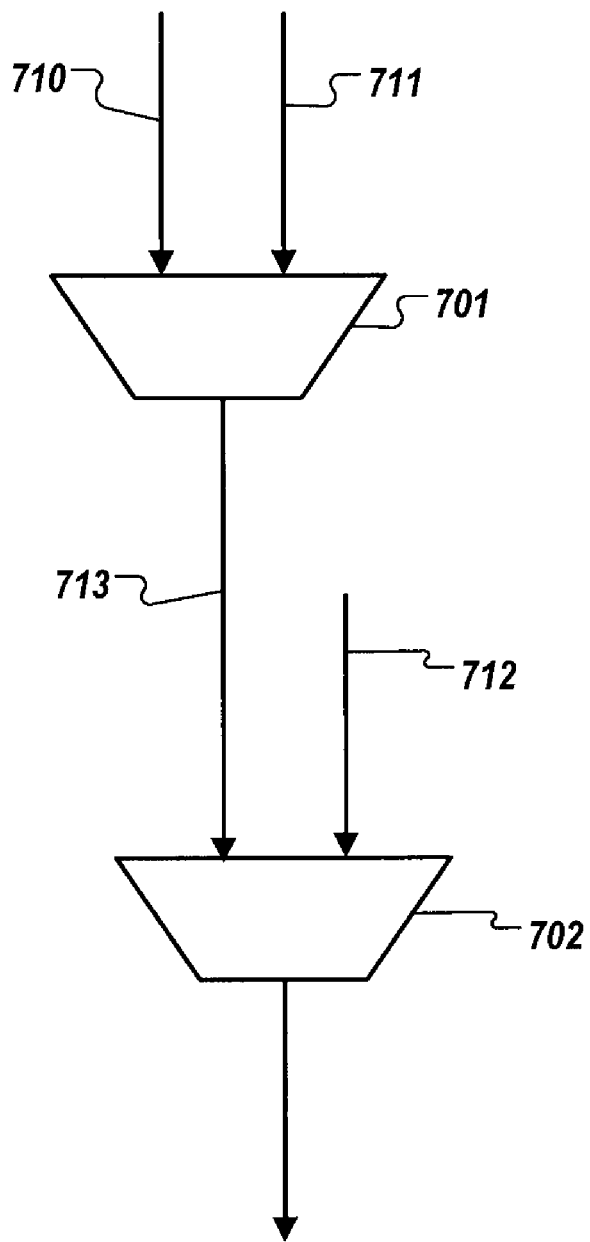
FIG. 7 is an example multi-level arbitration structure in an on-chip interconnect

FIG. 7 illustrates one example of a multi-level arbitration structure 700 in an on-chip interconnect. Two-input arbitration points 701 and 702 are selecting between three input links 710, 711 and 712. In this implementation, arbitration point 702 has a fixed arbitration, always giving link 712 highest priority for equal levels of in-band urgency. Assume that a packet has started to transfer on link 711 and is now presented on link 713 to arbitration point 702. As long as new requests are presented on link 712, the packet on link 713 will be back-pressured and not selected by the arbitration scheme in arbitration point 702. If now, a high urgency packet arrives on link 710, this packet cannot be arbitrated for by 701 since the packet from link 711 is already selected and "waiting" on link 713. Using the pressure mechanism, the urgency value of the packet on link 710 will be transferred on the out-of-band pressure signal on link 713. If this pressure value is higher than the urgency value of the packets on link 712, arbitration point 702 will arbitrate for the packets on link 713 by first processing the packet that originated from link 711 then processing the high urgency packet that originated on link 710.

Interface Signals

At the transaction-level interface of the NoC (e.g., an interface with an IP Core), three signals can be defined. In one embodiment of the invention, the signals can be called "IF_Urgency", "IF_Pressure" and "IF_Hurry", where the prefix "IF" in the signal names refers to term "InterFace." Each one of these signals can be configured to be one or more bits and a priority level can be encoded onto those bits using, for example, binary encoding. Not all signals need to be present or used at the transaction-level interface. In one embodiment, the selection of which signals to implement at the interface can be configurable by a user through a Graphical User Interface (GUI).

In the initiator NIU, where the transaction level information is packetized, the information on the IF_Urgency signal is used to define the urgency field in the header of the packet. In one embodiment, the urgency field is determined from the IF_Urgency signal through a one-to-one mapping, but other mappings can also be used. Such other mappings are useful to translate the values of "IF_Urgency" of the local transaction-level interface to global system-wide values. The selection of values of "IF_Urgency" can be defined by the IP Core design and these values may not be consistent with the system-requirements when multiple independently designed IP Cores are being interconnected through a NoC.

In a NoC architecture, the request and response paths can be configured independently. In one embodiment, the urgency of a request packet is transferred to the response packet to create an end-to-end priority. In one embodiment, this transfer of the urgency value can be implemented in the Target NIU. Optionally, the NoC can be configured to only implement the priority on the request path, but not on the response path. In yet another embodiment, the decision whether to transfer the value of the urgency of the request packet to the response packet can be made dependent on the type of transfer. For example, "READ" and "NON-POSTED WRITE" requests transfer the request urgency to the response packet, while "POSTED WRITE" commands do not.

A NON-POSTED write requires an acknowledgement of completion of the write. A POSTED WRITE is passed through the NoC for which an acknowledgement is not required.

The transaction-level interface field "IF_Pressure" can be connected to the out-of-band pressure field that was described above. It is possible that the logic in an IP Core is already aware of impending high priority requests before the requests that have been issued are accepted by the NoC. In this particular embodiment, the IF_Pressure field at the interface can be used to indicate such an occurrence and the value of "IP_Pressure" can be transferred onto the above described out-of-bend pressure field.

Similar to the potential need of remapping the valued of IF_Urgency to the urgency field, re-mapping of values on the IF_pressure field to the value on the pressure wires can be supported.

The third field "IF_Hurry" addresses the following circumstance. An IP Core may have issued a set of requests with a particular value of urgency and at some point in time, the IP Core may decide that these requests should be processed with a higher urgency. For example, an IP Core could have issued a set or "READ" requests where the response data is stored in a local FIFO and the FIFO may be in danger of under-flowing; that is, the read data is not returning quickly enough. In this case, the IP Core can assert a higher priority value on the "IF_Hurry" field. When this event occurs, the NIU can issue a special "Hurry" request packet to all the targets towards which that the NIU has outstanding transactions. This packet can have a value of urgency in the header defined by the value on "IF_Hurry" and can be routed through the NoC as the other request packets. An "Urgency" packet can "push" all the transactions in front of it on any path from the initiator to the target on which there are outstanding requests.

Since the value of "IF_Hurry" is encoded in the urgency field of the header, this embodiment allows for similar configuration options regarding the transfer of the urgency field from request to response packet as previously described. The value of the urgency field of the "Urgency" packet can optionally either be transferred to the response packet associated with the "Urgency" packet or not.

Similar to the potential need of remapping the valued of IF_Urgency to the urgency field, the optional need of re-mapping values on the IF_Hurry field to the value on the urgency field in the header of the "Urgency" packet can be supported.

Urgency Packet Generation

In one embodiment, an initiator NIU can contain a table. The table has an entry for every route that a packet can take through the interconnect. For each route represented in the table, a value is stored representing the priority level of the most recent transaction request sent on that route. For each route represented in the table a count is stored. The count is incremented whenever a transaction request is sent on that route and the count is decremented whenever a response is received from a transaction sent on that route. When an "IF_Hurry" is asserted at the initiator interface an "Urgency" packet is sent only on the routes for which the "IF_Hurry" priority level of the generated transaction is greater than the priority level of the most recent transaction previously sent along the route. The table is then updated with the priority level of the urgency packet. If the packet is blocked by flow control then the pressure mechanism described above is applied.

In another embodiment the table of transaction counts and priorities has entries that correspond to address ranges instead of routes.

In one embodiment, the priority level of a transaction is determined within the NoC by a bandwidth limiter. A bandwidth limiter can be associated with an initiator. The bandwidth limiter can observe the size of each request packet issued to the interconnect by the initiator. The size can be added to a counter. The counter can accumulate the count within a sliding window of time. When the count in the bandwidth limiter exceeds a threshold, the bandwidth limiter can block transactions until the count falls below the threshold.

In another embodiment, the priority level of a transaction is assigned within the NoC by a bandwidth regulator. The bandwidth regulator measures the bandwidth on the response network. When the bandwidth exceeds a threshold, the bandwidth regulator can reduce the priority of transaction requests until the response bandwidth falls below the threshold. More than one threshold can be applied such that a higher threshold causes a lower priority. When the observed bandwidth crosses below a threshold, the priority of transaction can be increased and an "Urgency" packet can be generated.

In one embodiment, the time span covered by the windows in the above two embodiments may can be configured. This has the benefit of providing bandwidth control for initiators with different long-term or short-term bandwidth requirements. Controlling maximum bandwidth limits on one initiator ensures the best interconnect availability to other initiators. This can improve their response latency.

In another embodiment, the priority level of a transaction is determined by the fullness of a write FIFO and a read FIFO associated with an initiator. More than one threshold can be applied to each FIFO. The priority level of transactions can be determined by the fullness of the FIFOs relative to thresholds. When the fullness of a write FIFO associated with the initiator exceeds a particular threshold, an "Urgency" packet can be generated. When the fullness of a read FIFO associated with the initiator falls below a particular threshold, an "Urgency" packet can be generated.

Example Routing Within On-Chip-Interconnect

Figure 9:
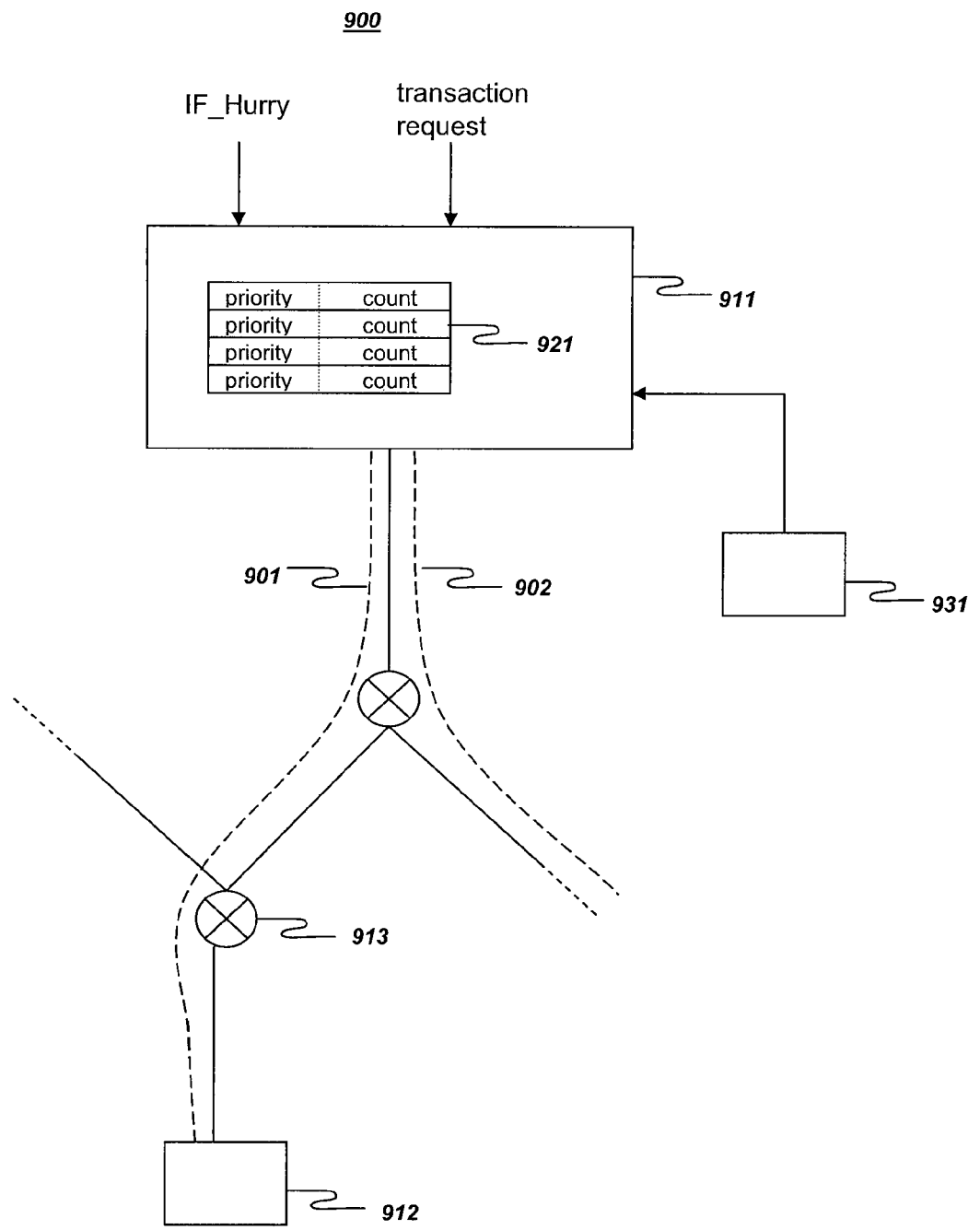
FIG. 9 illustrates an example of routing within an on-chip-interconnect.

FIG. 9 illustrates an example routing 900 within an on-chip-interconnect. Two routes 901 and 902 are shown. One route between initiator interface 911 and target interface 912 is congested at switch 913. A table 921 stores one entry for each route that exists between the initiator interface 911 and target interfaces in the system. The table 921 entries can include the priority of most recently transmitted transactions and the number of transactions that have been transmitted without having received a response. Routing priority for initiated transactions can be determined as a function of the "IF_Hurry" signal. The "IF_Hurry" signal can be a side-band signal to the transaction request path. The priority of urgency packets can be a function of the "IF_Hurry" signal and bandwidth regulator 931. When congestion at switch 913 causes transaction responses to be delayed, threatening an overflow or underflow condition in the initiator IP, switch 913 asserts the "IF_Hurry" signal. If the "IF_Hurry" priority exceeds the priority of the table 921 entry for route 901, and route 901 has one or more transactions requests pending for which a response has not been received, then an "urgency" packet can be generated and transmitted on route 901. If bandwidth regulator 931 indicates that route 901 requires more bandwidth, then an "urgency" packet can be generated and transmitted on route 901, and the priority of the most recently transmitted packet in the entry of table 921 corresponding to route 901 can be set to the urgency level of the transmitted "urgency" packet.

Target NIU Interface

As described above, in this embodiment mechanisms have been implemented to transfer and use priority information as presented on up to three fields at an initiator interface. This information can optionally be presented to the target at the target NIU interface. The value of the pressure field can define the value on the "IF_Pressure" field, the value of the in-band urgency field in the header can define the value on the in-band "IF_Urgency" field of the transaction and the value of the "IF_Hurry" field can be determined by the urgency value in the "Hurry" request packet.

Similar to the potential need of remapping the values of IF_Urgency, IF_Hurry and IF_Pressure in the initiator NIU from the "local" interface values to global values, the NIU at the target can optionally remap the global values of pressure and urgency to the values required by the Target IP Core at the target NIU Interface.

Since an on-chip-interconnect or a NoC for a complex SoC, such as a cell-phone application processor or video processing chip can be quite complex, many configuration decisions need to be managed. With regards to the embodiments presently discussed, examples of the additional configuration decisions are the selection of the transaction-level interface encoding options, the selection of the encoding of the priority information, the selection of the re-mapping of the priority information, and the decision on whether to transfer the request priority information to the response. In one implementation, the selection of the parameters can be made through a Graphical User Interface (GUI), allowing for a quick and efficient configuration of the packet-formats and associated links.

Figure 8:
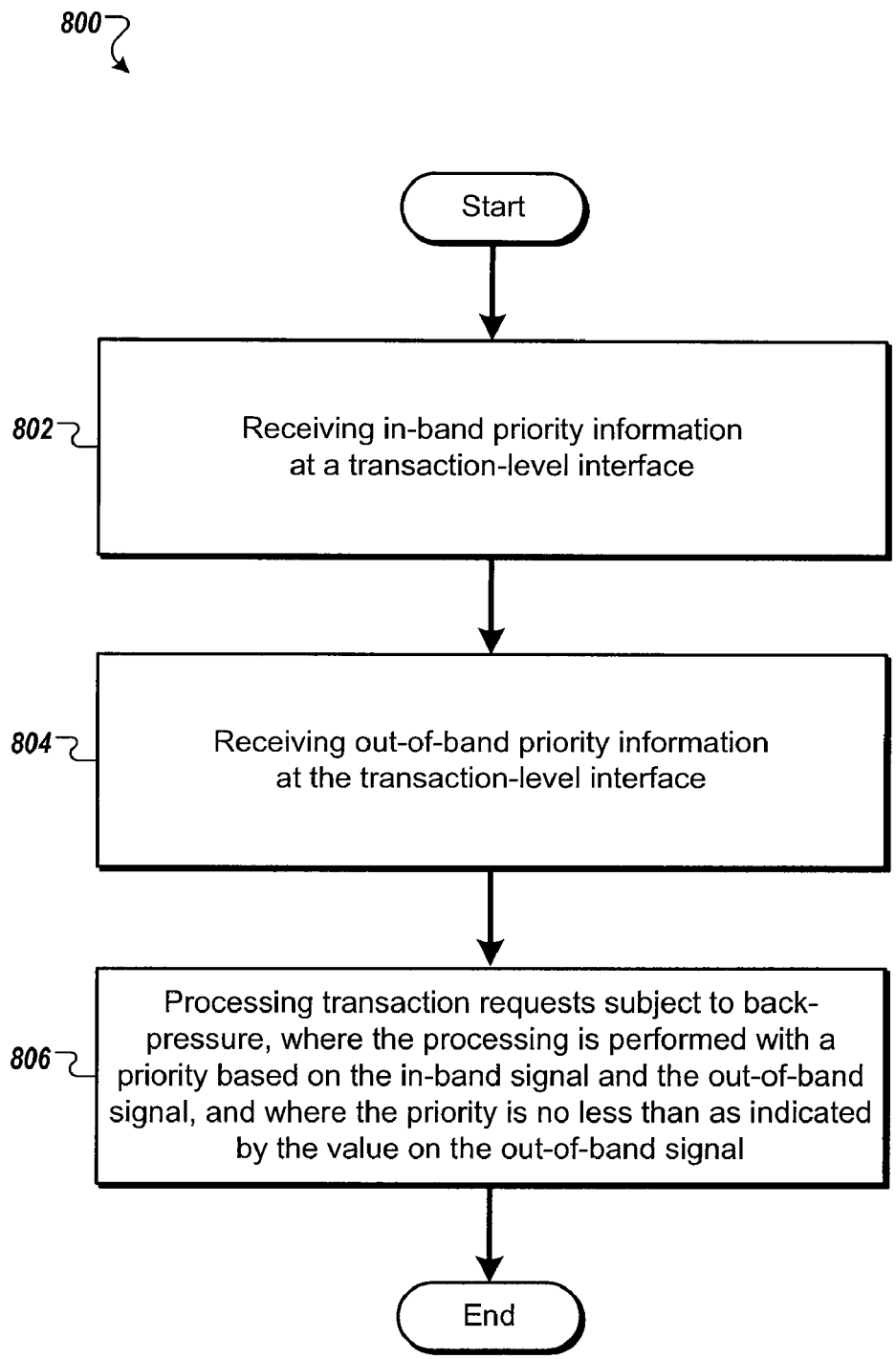
FIG. 8 is a flow diagram of an example process for implementing QoS features in a multi-level arbitration structure in an on-chip interconnect.

FIG. 8 is a flow diagram of an exemplary process 800 for implementing QoS features in a multi-level arbitration structure in an on-chip interconnect. In some implementations, process 800 can begin by receiving in-band priority information (802) and receiving out-of-band priority information (804) at a transaction-level interface of an on-chip interconnect. Process 800 processes transaction requests subject to back pressure, where the processing is performed with a priority based on a value of the in-band signal and a value of the out-of-band signal, and where the priority is no less than as indicated by the value on the out-of-band signal (806).

While this specification contains many specifics, these should not be construed as limitations on the scope of what is claimed or of what can be claimed, but rather as descriptions of features specific to particular implementations. Certain features that are described in this specification in the context of separate implementations can also be implemented in combination in a single implementation.

Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

Thus, particular implementations have been described. Other implementations are within the scope of the following claims.

What is claimed is:

1. A method of transmitting priority information at a transaction-level interface of an on-chip-interconnect, comprising:
defining a first signal that transmits priority information in-band with a transaction-level request; and
defining a second signal that transmits priority information out-of-band with regards to transaction-level requests, where the second signal indicates that at least one transaction that originated from the transaction-level interface is to be processed by the on-chip-interconnect with a priority no less than as indicated by a value of the second signal.

2. The method of claim 1, further comprising:
defining a third signal that transmits priority information out-of-band with regards to transaction-level requests, where the third signal indicates that, on initiator-target paths originating from the transaction-level interface, at least one request of a transaction that is subject to back-pressure is to be processed by the on-chip-interconnect with a priority no less than as indicated by the value of the second signal.

3. The method of claim 2, where the priority information derived from the value on the third signal is transferred out-of-band on initiator-target paths originating from the initiator interface along paths where requests are subject to back-pressure until a point where a request on a link is not subject to back-pressure.

4. The method of claim 2, where a value of at least one signal indicating priority on the transaction-level interface is remapped onto a different value by the on-chip-interconnect.

5. The method of claim 2, where the value of at least one signal indicating priority on the transaction-level interface is encoded using bar-graph encoding.

6. The method of claim 1, where both the request and response of the transaction are processed by the on-chip-interconnect with a priority no less than as indicated by the value on the second signal.

7. The method of claim 1, where a decision whether the response of the transaction is processed by the on-chip-interconnect with a priority no less than as indicated by the value of the second signal is determined by an attribute of the transaction-level request.

8. The method of claim 1, where a decision whether the response of the transaction is processed by the on-chip-interconnect with a priority no less than as indicated by the value of the second signal is configured in the on-chip-interconnect.

9. The method of claim 8, where the decision whether the response of the transaction is processed with the priority is configured through a Graphical User Interface.

10. The method of claim 1, where a value of at least one signal indicating priority on the transaction-level interface is remapped onto a different value by the on-chip-interconnect.

11. The method of claim 1, where the value of at least one signal indicating priority on the transaction-level interface is encoded using bar-graph encoding.

12. The method of claim 1, where the priority information derived from the value on the first signal is transferred in-band with the transfer associated with the transaction-level transfer as it is processed by the on-chip-interconnect.

13. The method of claim 12, where the on-chip-interconnect is a Network-On-Chip.

14. The method of claim 13, where the in-band transfer of priority information is included in a header of the packet.

15. The method of claim 12, where the priority information that is transferred in-band is transferred to an out-of-band signal along paths where requests are subject to back-pressure, originating from a first arbitration point where a request is subject to back-pressure until a point where a request on a link is not subject to back-pressure.

16. The method of claim 15, where the on-chip-interconnect is a Network-On-Chip.

17. The method of claim 16, where in-band transfer is implemented by carrying the in-band information in a header of a packet associated with the transaction request.

18. The method of claim 15, where the priority information on the second signal is encoded using bar-graph encoding.

19. The method of claim 12, where the out-of-band priority information is transferred from the on-chip-interconnect logic to a protocol-defined signal that is part of a target transaction level interface.

20. The method of claim 1, where the on-chip-interconnect is a Network-On-Chip.

21. The method of claim 1, where in-band transfer is implemented by carrying the in-band information in a header of a packet associated with the transaction request.

22. The method of claim 1, where an encoding of a signal of the transaction-level interface is different for a second transaction-level interface of the on-chip-interconnect.

23. The method of claim 1, further comprising:
defining a third signal; and
when a value of the third signal is greater than a value of a most recent previously transmitted request, sending a null request with the value of the second signal assigned to the value of the third signal.

24. The method of claim 23, where the value of the first signal of a multiplicity of most recent previously transmitted requests are stored in a table in which table entries correspond to routes through the on-chip-interconnect.

25. A method of transmitting priority information at a transaction-level interface of an on-chip-interconnect, comprising:
receiving in-band priority information at the transaction-level interface;
receiving out-of-band priority information at the transaction-level interface; and
processing transaction requests subject to back-pressure, where the processing is performed with a priority based on a first value on the in-band signal and a second value on the out-of-band signal, and where the priority is no less than as indicated by the second value on the out-of-band signal.

26. The method of claim 25 wherein the first value or the second value is determined by a bandwidth requirement of a data-flow.

27. The method of claim 25 wherein the first value or the second value is determined by a bandwidth regulator.

28. The method of claim 25 wherein the in-band priority information is encoded in a packet.

29. The method of claim 25 wherein the processing is performed by a memory scheduler.

30. The method of claim 25 wherein the first value or the second value is determined by a latency requirement of a data-flow.

31. The method of claim 29 wherein the transaction-level interface uses the AXI protocol.

32. The method of claim 29 further comprising receiving out-of-band priority information at a second transaction-level interface where the processing is performed with a priority based on the second value and a third value on the out-of-band signal of the second transaction-level interface, and where the priority is no less than as indicated by the third value.

33. A method of transmitting transactions through an on-chip-interconnect wherein each transaction is assigned a distinct priority level by a source or at a source interface, and wherein the priority of at least one transaction blocked at an arbitration point for access to a destination is propagated ahead of the arbitration point and thereby determines the order in which the transactions are completed.

34. The method of claim 33, wherein priority is assigned based on a fullness of a write first-in-first-out (FIFO) or emptiness of a read FIFO at a transaction initiator.

35. The method of claim 33, wherein the on-chip-interconnect contains multiple transactions in FIFOs and an initiator causes the transmission of a new transaction that changes the priority of one or more other transactions within the on-chip-interconnect.

36. The method of claim 33, wherein a transaction changes the priority of existing transactions within FIFOs along a single route between an initiator interface and a target interface.

37. The method of claim 33, wherein a transaction is automatically generated in response to a measurement of data transmission bandwidth usage within the interconnect.

* * * * *

UNITED STATES PATENT AND TRADEMARK OFFICE
CERTIFICATE OF CORRECTION

PATENT NO. : 8,316,171 B2
APPLICATION NO. : 12/835623
DATED : November 20, 2012
INVENTOR(S) : Philippe Boucard Page 1 of 1

It is certified that error appears in the above-identified patent and that said Letters Patent is hereby corrected as shown below:

Title Page, Item (57), (Abstract), Column 2, delete "Servitrce" and insert -- Service --, therefor.

In Claim 19, Line 39, Column 11, delete "out-of -band" and insert -- out-of-band --, therefor.

In Claim 31, Line 28, Column 12, delete "29" and insert -- 25 --, therefor.

In Claim 32, Line 30, Column 12, delete "29" and insert -- 25 --, therefor.

Signed and Sealed this
Fifth Day of February, 2013

Teresa Stanek Rea
*Acting Director of the United States Patent and Trademark Office*